2,890,709

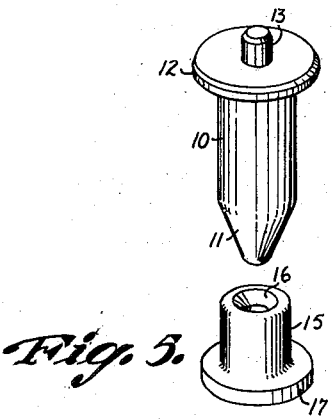
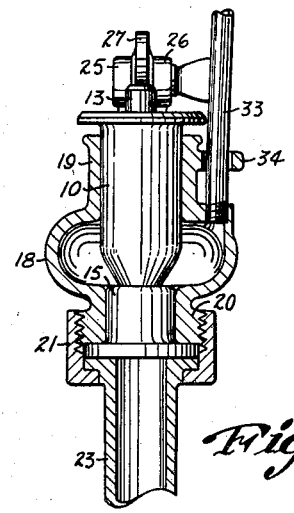
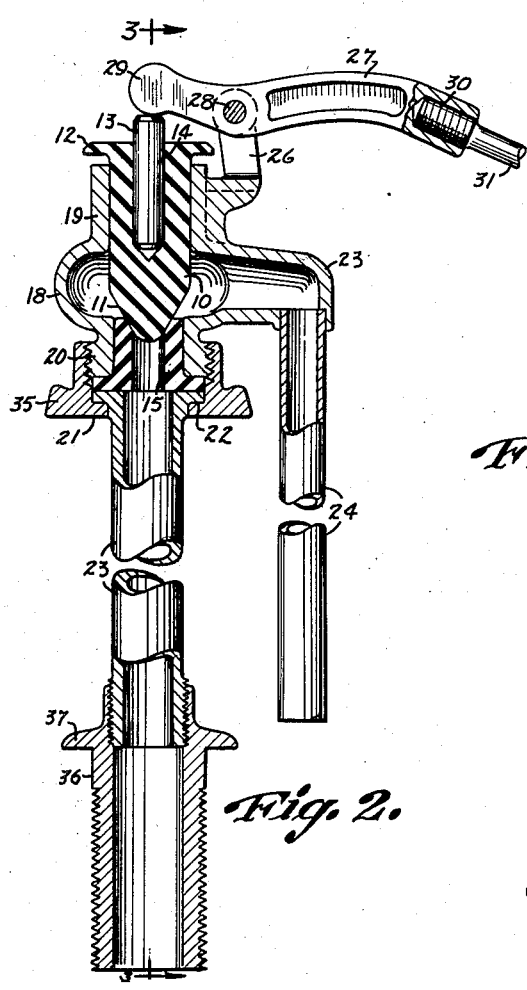
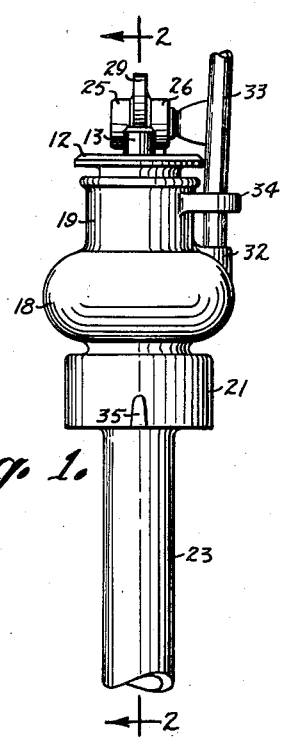
June 16, 1959 — P. P. PARISO — 2,890,709
NOISELESS FLUSH TANK VALVE
Filed Oct. 1, 1956
INVENTOR.
Pasquale P. Pariso.
BY Victor J. Evans & Co.
ATTORNEYS United States Patent Office 2,890,709
Patented June 16, 1959

NOISELESS FLUSH TANK VALVE

Pasquale P. Pariso, Elmira, N.Y.

Application October 1, 1956, Serial No. 613,277

2 Claims. (Cl. 137—216)

This invention relates to plumbing fixtures and fittings particularly of the type used in combination with flush tanks of toilet bowls, and in particular a float actuated valve having a valve body adapted to be mounted on the upper end of a supply tube or pipe with an outlet pipe depending from one side and in which the valve elements include a cylindrical plug having a conical shaped lower end formed of rubber or other suitable resilient material and slidably mounted in a cylindrical section or sleeve at the upper end of the valve body and a valve seat secured in the lower end of the valve body and positioned to coact with the conical shaped lower end of the plug whereby downward movement of the float actuated lever carries the plug against the seat and closes the valve.

The purpose of this invention is to eliminate noise and particularly chatter resulting from the slow closing movement of a flush tank valve so that the valve is substantially noiseless.

This invention is an improvement over the flush tank valve of my co-pending application filed April 4, 1956, with the Serial Number 576,106 in that, in addition to making the seat of rubber or other resilient material the complete coacting element is also made of rubber or the like and this rubber cylinder or plug replaces all of the internal mounting elements whereby the valve includes only the body with the seat and plug.

Various other attempts have been made to eliminate the noise of flush tank valves, however, it is difficult to control the slow closing movement to such an extent that all noise is eliminated. For this reason the interior metal mounting elements or the movable valve elements are eliminated and replaced with a plug of resilient material and with the two coacting resilient elements forming the opening and closing parts of the valve it is possible to eliminate all noise.

The object of this invention is, therefore, to provide means for forming a movable coacting element of resilient material which coacts with a seat of similar material to provide a positive closing valve in which all noise is eliminated.

Another object of the invention is to provide a noiseless flush tank valve in which a movable valve element, being of resilient material, provides a packing gland or seal preventing leakage through the bonnet or upper portion of the valve body.

A further object of the invention is to provide a noiseless flush tank valve in which both the stationary and movable elements of the valve are of rubber or other resilient material in which the valve is of a simple and economical construction.

With these and other objects and advantages in view the invention embodies a valve body having a circular recess in the intermediate portion with an outlet tube depending from an extension at one side of the valve body and communicating with the recess, and having a sleeve extended upwardly and aligned with a threaded boss extended downwardly and in which a lever actuated plug slidably mounted in the sleeve extended upwardly coacts with a valve seat in the threaded boss to provide closure means for the valve.

Other features and advantages of the invention will appear in the following description taken in connection with the drawing wherein:

Figure 1 is a side elevational view of the improved noiseless flush tank valve.

Figure 2 is a vertical section through the valve taken on line 2—2 of Figure 1 with parts broken away and parts shown in elevation and showing the valve with the coacting valve elements positioned to close the valve.

Figure 3 is a vertical section through the valve body taken on the line 3—3 of Figure 2 also showing the device with the valve in a closed position and showing the end extending upwardly from the annular recess in the valve body.

Figure 4 is a view illustrating the movable valve element or plug which is formed of rubber or other resilient material.

Figure 5 is a view showing a bushing in which the valve seat is formed and it will be understood that the bushing may also be formed of rubber or other suitable resilient material.

Referring now to the drawing wherein like reference characters denote corresponding parts the improved noiseless flush tank valve of this invention includes a cylindrical valve element or plug 10, having a conical-shaped lower end 11 with a flange 12 on the upper end and with an insert 13 positioned in an opening 14 in the upper part thereof, as shown in Figure 2, a coacting bushing 15 having a beveled valve seat 16 in the upper end with a flange 17 on the lower end, and a valve body having an annular intermediate recess 18 with a cylindrical portion 19 extended upwardly therefrom and with a threaded boss 20 extended downwardly from the lower side.

The plug 10 is mounted to slide vertically in the sleeve 19 and the lower end is aligned with the bushing 15 secured in the boss 20 by a coupling 21 which, as illustrated in Figure 2, clamps the flange 18 of the bushing and also a flange 22 on the upper end of a tube 23 against the lower end of the boss.

The valve body 20 is provided with an extension 23 from which an inlet tube 24 extends whereby with the lower end of the tube extended downwardly into a flush tank incoming water flows through a submerged outlet and substantially all noise resulting from the water passing into the tank is eliminated.

The valve body is also provided with upwardly extending bearings 25 and 26 between which a float actuated lever 27 is pivotally mounted by a pin 28, and, as shown in Figure 2, the end 29 of the lever is positioned to engage the upper end of the pin 13 of the valve part 10.

The extended end of the lever 27 is provided with a threaded socket 30 in which a float carrying rod 31 is threaded and with the parts mounted, particularly as illustrated in Figure 2, upward movement of the float causes the knob or end 29 to slide the plug or valve element 10 downwardly with the lower end coacting with the valve seat 16 of the bushing 15 to close the valve.

The valve body is also provided with a boss 32 from which a tube 33, providing a vent, extends and, as shown in Figures 1 and 3, tube 33 extends through an eye 34 extended from one side of the cylindrical portion or sleeve 19 forming the upper end of the valve body. The vent extends upwardly above the water level in the flush tank with the tank full.

The coupling 21 is provided with ears 35 to facilitate gripping the coupling with a wrench or the like.

The flush tank valve is mounted on the upper end of the tube or pipe 23 and, as shown in Figure 2, the lower end of the tube is threaded into a nipple 36 by which the tube is mounted in the bottom of a flush tank. The nipple is provided with suitable conventional lock nuts and washers which clamp the flange 37 against the inner surface of the bottom of the tank.

With the parts assembled as illustrated and described the float drops downwardly as water is flushed from the tank releasing the valve element or plug 10 whereby pressure of water in the tube 23 forces the member 10 upwardly opening the valve and permitting water to pass through the recess 18 and tube 24 into the lower end of the tank. As water flows into the tank the float on the lower end of the rod 31 moves upwardly whereby the knob 29 urges the pin or stem 13 and plug 10 downwardly gradually closing the valve as hereinbefore described.

It will be understood that modifications within the scope of the appended claims, may be made in the design and arrangement of the parts without departing from the spirit of the invention.

What is claimed is:

1. In a flush tank valve, the combination which comprises a valve body having a cylindrical portion extended upwardly from the intermediate part and having a threaded boss on the lower end, a rubber bushing having a beveled valve seat in the upper end and an annular flange extended from the periphery of the lower end positioned in the threaded boss, a tube having a flange on the upper end extended downwardly from the bushing, a coupling threaded on the threaded boss for clamping the flange of the tube and also the flange of the bushing against the end of the threaded boss, a rubber plug having a conical-shaped lower end and a flange extended from the periphery of the upper end slidably mounted in the cylindrical portion of the valve body and positioned whereby the conical shaped lower end coacts with the valve seat in the upper end of the bushing for closing the valve, a pin extended upwardly from the plug, a lever pivotally mounted on the body and having a knob positioned to engage the pin extended from the plug, and a tube extended downwardly from the intermediate part of the valve body.

2. In a flush tank valve, the combination which comprises a valve body having a cylindrical portion extended upwardly from the intermediate part and having a threaded boss on the lower end, a rubber bushing having a valve seat in the upper end and a flange extended from the periphery of the lower end positioned in the threaded boss, a tube having a flange on the upper end extended downwardly from the bushing, a coupling threaded on the threaded boss and adapted to clamp the flange of the tube and also the flange of the bushing against the lower end of the threaded boss, a rubber plug having a conical-shaped lower end and a flange extended from the periphery of the upper end slidably mounted in the cylindrical portion of said valve body and positioned whereby the conical-shaped lower end coacts with the valve seat in the upper end of the bushing for closing the valve, a pin extended upwardly from the plug, a lever pivotally mounted on the body and having a knob positioned to engage the pin extended from the plug, a tube extended downwardly from the intermediate part of the valve body, and a tube extended upwardly from the intermediate part of the valve body providing a vent.

References Cited in the file of this patent

UNITED STATES PATENTS

| | | |
|---|---|---|
| 598,133 | Brinkman | Feb. 1, 1898 |
| 943,755 | Morrison | Dec. 21, 1909 |
| 955,457 | Geurink | Apr. 19, 1910 |
| 1,035,663 | Utley | Aug. 13, 1912 |
| 1,231,399 | McPartland | June 26, 1917 |
| 1,612,350 | Berry | Dec. 28, 1926 |
| 1,789,964 | Buehrer | Jan. 27, 1931 |
| 2,675,204 | Johnson | Apr. 13, 1954 |
| 2,701,119 | Smith | Feb. 1, 1955 |
| 2,730,122 | Svirsky | Jan. 10, 1956 |